US007860768B2

(12) United States Patent
Herter et al.

(10) Patent No.: US 7,860,768 B2
(45) Date of Patent: Dec. 28, 2010

(54) EXCEPTION HANDLING FRAMEWORK

(75) Inventors: Klaus Herter, Leimen (DE); Wolfram Siefke, Heidelberg (DE); Henrique Sievers-Tostes, Duesseldorf (DE); Jens Staeck, Sandhausen (DE)

(73) Assignee: SAP AG, Walldorf (DE)

( * ) Notice: Subject to any disclaimer, the term of this patent is extended or adjusted under 35 U.S.C. 154(b) by 987 days.

(21) Appl. No.: 11/287,150

(22) Filed: Nov. 22, 2005

(65) Prior Publication Data

US 2007/0168753 A1 Jul. 19, 2007

(51) Int. Cl.
G06Q 40/10 (2006.01)
(52) U.S. Cl. ........................................... 705/35
(58) Field of Classification Search ............... 705/35
See application file for complete search history.

(56) References Cited

U.S. PATENT DOCUMENTS 6,304,963 B1 * 10/2001 Elwood ..................... 712/244
7,289,964 B1 * 10/2007 Bowman-Amuah ............ 705/1

OTHER PUBLICATIONS

Richard Carlsson, Erlang's Exception Handling Revisited, Erlang Workshop, Snowbird, UTAH 2004 pp. 1-10.*
Shookoohi-Kayvan Kamran, A concurrent error detection and correction algorithm for fault tolerant VLSI arithmetic array processors, Michigan State univeristy, pp. 1-141.*
Barabara Klein, Can Humans Detect Errors in Data, MIS Quarterly, vol. 21, No. 2, Jun. 1997, pp. 169-194.*
http://www.sap.com/usa/solutions/netweaver/pdf/BWP_SB_SAP_NetWeaver_Platform_2004.pdf , "SAP NetWeaver Platform 2004, An Introduction for Developers", 43 pgs., Aug. 2005.
http://www.sap.com/usa/solutions/esa/pdf/BWP_WP_Enterprise_Services_Architecture_Intro.pdf, "Enterprise Services Architecture—An Introduction", 18 pgs., Nov. 2004.

* cited by examiner

Primary Examiner—James P Trammell
Assistant Examiner—Abdul Basit
(74) Attorney, Agent, or Firm—Schwegman, Lundberg & Woessner, P.A.

(57) ABSTRACT

Systems and techniques for implementing an exception handling framework are described. An exception register is configured to store multiple error messages and rules comprising instructions for responding to the error messages. An exception handler in communication with first and second process components is configured to: detect an error message generated by at least one of the first and second process components; determine that the error message is stored in the exception register; and respond according to a rule corresponding to the error message. The rule uses information pertaining to a business scenario being implemented in conjunction with the first and second process components, and the business scenario is at least partially unavailable to at least one of the first and second process components.

20 Claims, 3 Drawing Sheets

EXCEPTION HANDLING FRAMEWORK

TECHNICAL FIELD

This invention relates to exception handling in modular architectures.

BACKGROUND

To manage its operations, an enterprise can typically include multiple business applications that are integrated into one platform, such as, for example, an SAP NetWeaver® application-integration platform available from SAP AG, of Walldorf, Germany. The business applications are typically configured to perform one or more business processes and may be distributed across various process components. Examples of business processes include customer relationship management processes, product lifecycle management processes, supply chain management processes, and manufacturing processes. The process components may be implemented with different technology stacks and supplied from different vendors. Moreover, one or more of the process components may implement a business process that involves a computing system of another enterprise.

Errors that are generated during the execution of business processes may depend on a combination of applications and business processes being executed. Although most process components are equipped with their own error-handling mechanisms, as the modularity and complexity of the architecture to which they belong increases, error handling performed by individual process components becomes increasingly difficult and more error-prone. This is due, in part, because process information is often not confined to any one process component but rather distributed across various process components. Thus, the process knowledge at any one component is incomplete.

Inaccurate error handling by one or more process components may, for example, fail to detect errors which could then propagate to other components within the architecture. A mischaracterization of the severity of a detected error may also occur resulting in a less optimal or inappropriate course of action to be taken. For example, if an error-handling mechanism characterizes an error as being more severe that it actually is, the mechanism may cause processes to be unnecessarily terminated.

As process components are added to or removed from an architecture, the exception handling mechanisms for some or all of the process components may need to be modified. This can be a daunting task if the architecture includes many process components.

SUMMARY

The invention provides systems and methods, including computer program products, for implementing an exception handling framework.

In general, in one aspect, the invention features a system that includes an exception register configured to store multiple error messages and rules comprising instructions for responding to the error messages; and an exception handler in communication with first and second process components (e.g., components of a service-oriented architecture). The exception handler is configured to: detect an error message generated by at least one of the first and second process components; determine that the error message is stored in the exception register; and respond according to a rule corresponding to the error message. The rule uses information pertaining to a business scenario being implemented in conjunction with the first and second process components, and the business scenario is at least partially unavailable to at least one of the first and second process components.

In general, in another aspect, the invention features a method and a computer program product for implementing an exception handling framework. In an exception register, multiple error messages and rules comprising instructions for responding to the error messages are stored. An error message generated by at least one of first and second process components is detected and a determination is made that the error message is stored in the exception register. A response is issued according to a rule corresponding to the error message, in which the rule uses information pertaining to a business scenario being implemented in conjunction with the first and second process components. The business scenario is at least partially unavailable to at least one of the first and second process components.

Embodiments may include one or more of the following. A pattern recognition engine may be provided and configured to: identify, over a predetermined time period, occurrences of error messages fitting a pattern; present a report showing the occurrences of the error messages fitting the pattern; and determine a rule for responding to future occurrences of the error messages fitting the pattern. The report may include information describing at least one of: a component that generated one of the error messages within the pattern, a reaction to the occurrences of the error messages fitting the pattern, and preconditions leading to the occurrences of the error messages fitting the pattern. The rule, for example, may include instructions that cause the exception handler to determine a severity of an error indicated by the error message in context to the business scenario; determine that an error is less severe than indicated by the error message; suppress the error message; allow a process that was running during the occurrence of the error message to continue running; and/or suppress one or more error messages within a pattern detected by the exception handler. The exception handler, and the first and second process components may be distributed across different system components.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
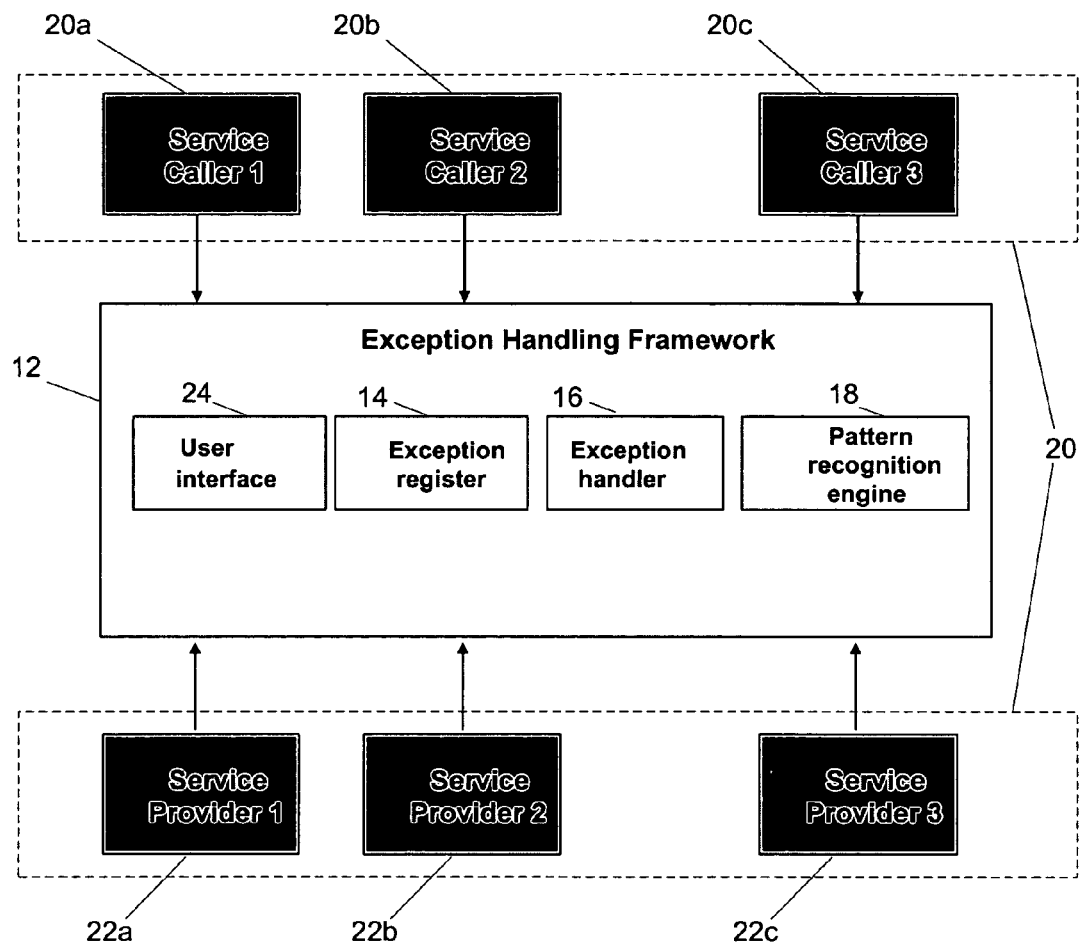
FIG. 1 is a block diagram of a service-oriented architecture that includes an exception handling framework that includes an exception handling framework with all communications passing through it.

FIG. 1 shows an exemplary service-oriented architecture 10, in which an exception handling framework (EHF) 12 responds to error messages (also referred to as "exceptions") generated from one or more service callers 20a-c and service providers 22a-c of the service-oriented architecture. The service providers 22a-c provide services that are consumed by the service callers 20a-c. For example, the first service caller 22a could be an electronic document and the first service provider 22a could be a spell-check application that checks for and corrects spelling errors within the electronic document. For ease of explanation, the service callers 20a-c and the service providers 22a-c are collectively referred to as "process components 20". Although only three service callers 20a-c and service providers 22a-c are shown in FIG. 1, in practice, the service-oriented architecture 10 may include any number of service callers and service providers. The service callers 20a-c communicate with the service providers 22a-c through the EHF 12, which acts like a proxy for service providers 22a-c and the service caller 20a-c. As the architecture 10 is modified, the error handling functionality of the EHF 12 can also be modified without requiring the components 20 to be modified. The architecture 10 is configured so that the EHF 12 is not a bottleneck for communications between the service callers 20a-c and the service providers 22a-c.

The service callers 20a-c and service providers 22a-c may be stand-alone re-usable modules that are designed to perform specific business processes and may implemented as software applications, hardware components, or a combination thereof. The service-oriented architecture 10 combines the service callers 20a-c and the service providers 22a-c to achieve an overall business solution that integrates the individual business processes. In one example, the service-oriented architecture 10 implements a customer-relations business solution in which the first service caller 20a and the first service provider 22a perform billing services, the second service caller 20b and the second service provider 22b perform call management services, and the third service caller 20c and the third service provider 22c perform customer history services.

Each of the components 20 focuses on one business context and is unaware of the larger business context to which it belongs. For example, the same billing-services component that is used to charge individual consumers for telephone usage in a telephone-services business context could also be used to charge companies for legal services rendered in a legal-services business context. The process architect combines the components 20 to perform a "business scenario" that describes the process components 20, the relationships between them, the objectives of each process component, the sequence of activities that each process component performs in order to achieve its objective, and the interrelationship between the activities performed by each process component, i.e. the overall flow of events.

When designing the service oriented architecture 10, the process architect must consider not only whether the combination of process components is technically feasible given technical constraints of the components and the system itself but also whether the combination of components can realize the business scenario. The collection of rules governing the interaction between business processes performed by the process components 20 in context to a particular business scenario is referred to as a "business process layer". When constructing the architecture 10, the architect tries to anticipate the errors that could arise in one or more of the components 20 and designs a construct for handling the errors should they occur. Anticipating which errors may occur is often difficult due to the complexity of the system and the architect often lacks a full knowledge concerning the affects of errors at the process level. Typically, at least some of the components 20 are provided by different vendors, and even if all of the components use a standard error message protocol, the way in which some of the components 20 respond to particular error messages may be different. Because each of the components 20 is not fully aware of the overall business scenario, a single component cannot make an informed decision about an error from a process-level perspective. Furthermore, different business scenarios may require different responses to a particular error message. For example, in some business scenarios a particular error message may be ignored while in other business scenarios, the same error may indicate a critical condition requires the immediate attention of a system administrator.

The EHF 12 intercepts any error messages produced by the components 20 and determines how to respond in a manner that best suits the particular business scenario being implemented by the service-oriented architecture 10. Although error messages are produced by the components 20, the components themselves 20 do not determine how to respond to them. Rather the EHF 12 makes the determination at the process layer. Using knowledge of the business scenario, the EHF 12, for example, can decide how severe an error really is in context to a business scenario. If the error is not serious, the EHF 12 may, for example, direct the process or processes that were running when the error occurred to continue as they normally would if the error had not occurred. If the error is more severe, the EHF 12 may, for example, redirect the process or processes from their normal course, invoke other processes, or stop one or more processes altogether and alert a system administrator. The EHF 12 keeps track of the business goals of all the components 20 and their relationships to the overall business scenario to handle errors on a process level where process knowledge is available.

The EHF 12 includes an exception register 14, an exception handler 16, and a pattern recognition engine 18. The EHF may also include a user interface 24 through which a user (e.g., a system administrator) may access and configure the exception register 14, an exception handler 16, and a pattern recognition engine 18.

The exception register 14 stores a list of error messages and a list of exception-handling rules corresponding to the error messages. The exception register 14 typically includes only error messages that most seriously affect the business scenario. In order to save memory and computing resources, error messages that are considered inconsequential with respect to the business scenario do not need to be stored in the exception register 14. The exception register 14 may also store patterns of error messages and corresponding rules. The rules may be created and managed by a user via the user interface 24. In some embodiments, the rules are stored and maintained separately from the exception register 14 in a different component (not shown) within the EHF 12.

The exception handler 16 monitors communications through the EHF 12 between the service callers 20a-c and the service providers 22a-b and intercepts any error messages produced by one or more components 20. The exception handler 16 compares the intercepted error messages to the error messages stored in the exception register 14. If a match is determined, the exception handler 16 operates according the rule corresponding to the error message. In some embodiments, the rule may instruct the exception handler 16 to ignore or suppress the error messages so that processing is not interrupted. For example, if an error message indicates that an entry in a field is missing but a rule corresponding to that error message indicates that the absence of the entry is unimportant at the process level and thus should be suppressed, the exception handling 16 suppresses the exception so that it does not propagate to other components in the service-riented architecture 10. The process of suppressing an exception is referred to as "masking" an exception. The EHF 12 masks non-relevant errors that could otherwise delay or terminate normal processing. In the event that the error message indicates a critical condition, the corresponding rule may instruct the exception handler 16 to terminate or invoke one or more processes at one or more process components 20. In this way, the severity of an error associated with a particular error message is built into the rule that corresponds to the error message.

In some embodiments, the rule may indicate a severity level associated with the error message that can be reported to a system administrator who then can address the error, for example, by configuring one or more of the process components 20. For example, the exception handler 16 may convert the severity information contained in the error message to a more accurately reflect the true severity of the error at the process level. In another example, the exception handler 16 may enable one or more of the service providers 22*a-c* to proceed with normal operation despite receiving an error message that would normally terminate their operation. The rules corresponding to the error messages may additionally include instructions that depend on which component generated the error message or the type of component that generated the error message (e.g., whether the error message was generated from one of the service callers 20*a-c* or from one of the service providers 22*a-c*).

If the exception handler 16 detects a pattern of errors, the pattern is compared to patterns of exceptions stored in the exception register 14. A pattern, for example, may indicate a sequence or combination of particular error messages and/or a combination of service providers 22*a-c* and/or service callers 20*a-b*. If a pattern match is determined, the exception handler 16 operates according the rule associated with the pattern. In some scenarios, the error messages within a pattern are correlated. For example, the pattern may include a primary error message that gives rise to follow-up error messages. In this example, the exception register 14 may store a rule for such a pattern that handles the primary error message but suppresses any follow-up error messages so that the system is not confronted with too many error messages. In another example, if the pattern includes a series of repeat error messages, a rule associated with that pattern may instruct the exception handler 16 to display only one of the repeated error messages to an administrator and suppress the other messages.

The pattern recognition engine 18 assists a user (e.g., a system administrator) with identifying occurring patterns of error messages that the user may not readily foresee. The user may then analyze the pattern to determine which if any corresponding rules should be implemented in response to the exception handler 16 receiving that pattern in the future. The pattern and the corresponding rules are then stored in the exception register 14.

The pattern recognition engine 18 monitors communications sent between the service callers 20*a-c* and the service providers 22*a-c*. The pattern recognition engine 18 may, for example, present a report showing the patterns that occurred most frequently over a period of time and additionally suggest rules that may be applicable for some of the patterns. For example, the pattern recognition engine may record over one-thousand combinations of error messages generated over a three-month monitoring period. The pattern recognition engine 18 may then determine the twenty combinations that occurred most frequently and present those in a report along with other information that includes the components that generated the error messages, how the system reacted to a particular pattern (e.g., if a particular process was terminated), preconditions leading to the occurrences of the error messages, and any other relevant information. Over time, the pattern recognition engine 18 builds up knowledge of which error messages are handled in a similar way and from that data, may suggest that a similar error message or pattern of error messages be handled similarly. This information is provided to a user (e.g., a system administrator) through the user interface 24. The user may then use the info provided by the pattern recognition engine 18 to implement new rules.

The information provided by the pattern recognition is especially useful when there are too many combinations of error messages for a user to analyze within a reasonable period of time. Also, because it is nearly impossible to predict all of the types of combinations of errors and their impact on the system, the analysis performed by the pattern recognition engine 18 enables a system administrator to implement new rules as new combinations of patterns are discovered or when various process components of the architecture 10 are added, removed, or modified.

Figure 2:
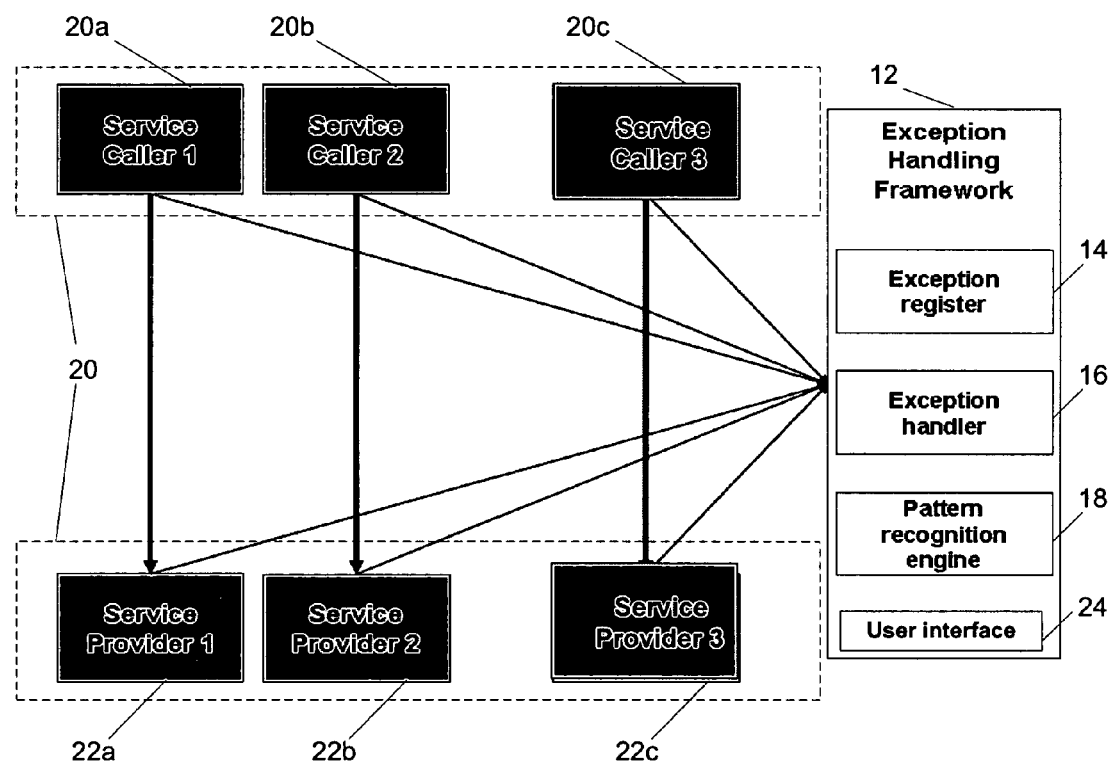
FIG. 2 is a block diagram of another service-oriented architecture that includes the exception handling framework shown in FIG. 1 with forked communication.

FIG. 2 shows an exemplary service-oriented architecture 30 in which the service callers 20*a-c* and the service providers 22*a-c* are directly connected to each other and to the EHF 12 through parallel communication channels. Between service caller and service provider can be various components for service orchestration or routing. These components are optional in any service orientated architecture and are not restrictive. In a parallel communication channel the information exchanged between a service caller and a service provider is sent completely or partly to the EHF 12. The service-oriented architecture 30 enables the EHF 12 to be easily connected to the components of an existing architecture without breaking any already established connections between the components. This improves scalability. Furthermore, the architecture 30 supports direct communication between the service callers 20*a-c* and the service providers 22*a-c* provided that no error messages that would cause a cease in communication are generated. The parallel structure of the architecture 30 reduces potential bottleneck between the service callers 20*a-c* and the service providers 22*a-c* which in turn improves performance.

Figure 3:
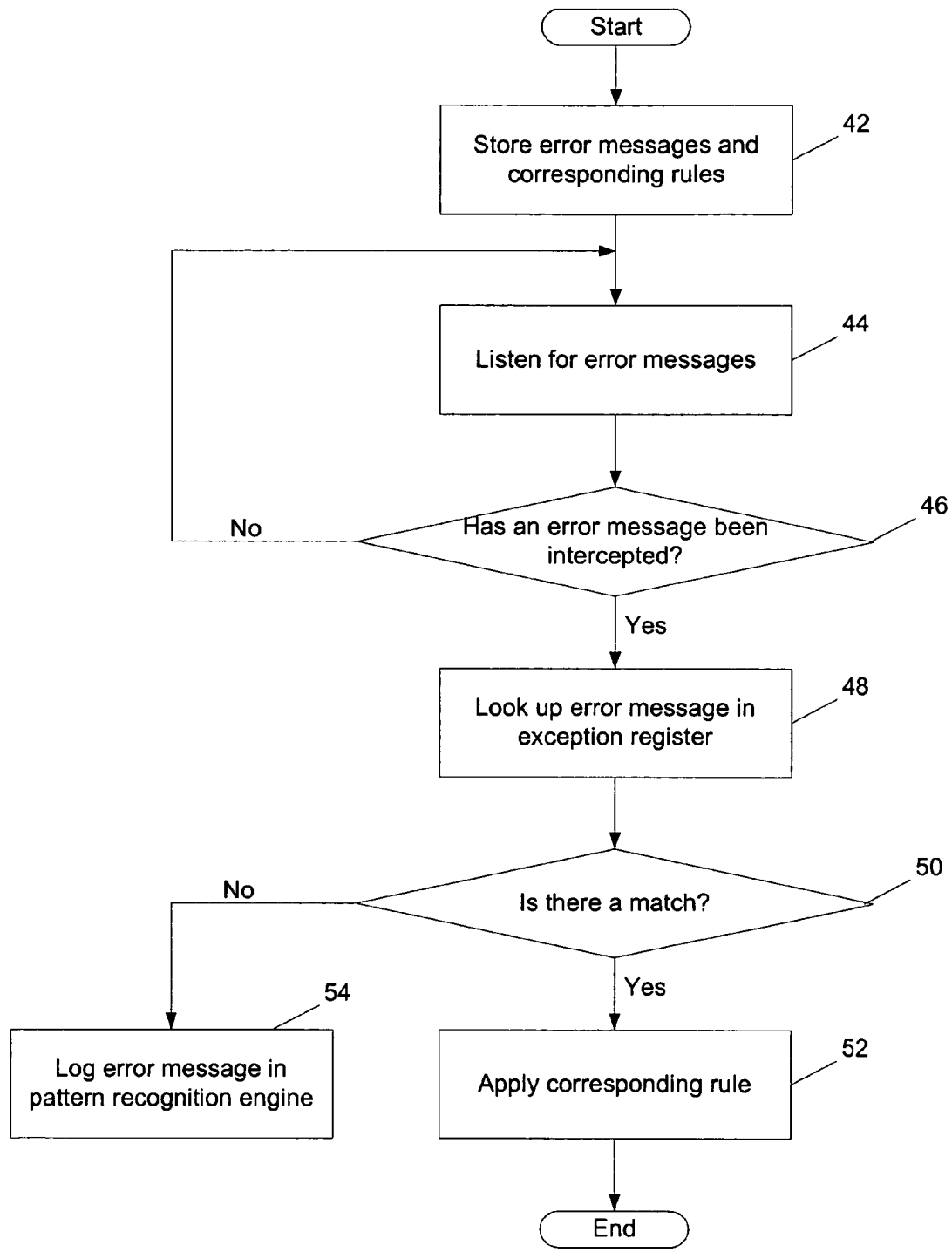
FIG. 3 shows a flowchart of a process for handling an error using the exception handling framework shown in FIGS. 1-2.

FIG. 3 shows a flowchart of a process 40 for handling an error using the exception handling framework shown in FIGS. 2-3. The exception register 14 stores (42) a list of error messages and corresponding rules for responding to the error messages. The error messages stored in the exception register 14 are typically indicative of the most important errors that are known to arise. Patterns of error messages that are known to occur and corresponding rules are also stored (42) in the exception register 14. In some embodiments, the error messages and corresponding rules are manually entered into the exception register 14 by a user (e.g., a system administrator) via the user interface 24. In other embodiments, the error messages and rules are recognized automatically by the pattern recognition engine and sent automatically or after user confirmation to the exception register 14. The exception handler 16 listens (44) for error messages by monitoring the communications between the service callers 20*a-b* and the service providers 22*a-c*. If the exception handler 16 intercepts (46) an error message or a pattern of error messages, it determines (48) whether the error message or the particular pattern is stored in the exception register 14. If a match is determined (50), the exception handler 16 applies (52) the rules that correspond to the error message or pattern of error messages. If the exception handler 16 determines (50) that there is no match (i.e., there is no rule corresponding to the intercepted error message), the error message and any other relevant information pertaining to the error message (e.g., any preconditions leading up to the error and reactions from one or more components 20) are logged (52) in the pattern recognition engine 18. The pattern recognition engine 18 analyzes the occurrences of similar error messages and patterns of error messages over a period of time, focusing on the exception situations with high business impact, and reports the analysis to a user and/or suggests new rules for responding to future occurrences of the error messages. These rules may then be stored (42) in the exception register 14.

During the analysis, the pattern recognition engine 18 may prioritize error messages according to their severity. Also, since all messages pass the EHF 12, the pattern recognition engine 20 can determine a correlation between different errors. For example if error A always induces error B elsewhere. The pattern recognition engine 18 may recommend that the administrator invoke a rule to display only one of the errors. For example, if error A is displayed, do not display error B (or vice versa). The result would be that only the real cause for A needs to be addressed, then error B will not occur rather than addressing the cause of error B and the cause of error A.

The pattern recognition engine 18 may also determine whether a specific functionality should be called and/or processed even when an error condition is displayed. For example, if error B is displayed and error A was issued just before, the pattern recognition engine 18 determines that error B is not serious and the process involved should be continued. The pattern recognition engine 18 may also recommend a rule that instructs the error handling framework EHF 12 to ignore a particular error occurring again and again during a particular system context and/or to display a short warning or to log the system status.

The pattern recognition engine 18 may also generate reports that include intelligent groupings of error messages, or other types of messages. For example, the pattern recognition engine could be used to group messages by different criteria (i.e., sender, time send, topic, etc.) so that they are easier to find.

In some embodiments, the EHF 12 could be used to filter an electronic mailbox of meeting requests. The exception register 14 may store a rule that determines the final status of a meeting for which there could be many of updates including rejections and cancellations. In these embodiments, the rule instructs the exception handler 16 to builds a summary of replies to the meeting request, determine if a reply is a cancellation, and bring that reply up first so that user does not waste time browsing through other replies that are not as important. The rule may also prioritize and summarizes replies.

The processes described herein, including process 40, can be implemented in digital electronic circuitry, or in computer software, firmware, or hardware, including the structural means disclosed in this specification and structural equivalents thereof, or in combinations of them. The processes can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes described herein, including method steps, can be performed by one or more programmable processors executing one or more computer programs to perform functions of the processes by operating on input data and generating output. The processes can also be performed by, and apparatus of the processes can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The processes can be implemented and distributed across different system components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The foregoing are examples for illustration only and not to limit the alternatives in any way. The steps of process 40 described herein can be performed in a different order and still achieve desirable results. The steps of process 40 do not need to be performed in real-time though some or all of them could be performed in real-time. Furthermore, some of the steps of process 40 could be performed asynchronously. Although the process 40 is described in context to a service-oriented architecture, the process 40 can be performed in any number of different architectures.

The EHF 12 described herein may be used in a variety of situations. For example the EHF 12 may be used to implement scenarios other than business scenarios. For example, the EHF 12 could be used to coordinate error-handling functions within automobiles, other machines, or components thereof. The EHF 12 may also be useful in prioritizing a list of messages and for searching a database of messages. The messages need not be error messages, and could instead be electronic-mail messages and other types of messages.

Method steps associated with generating a comprehensive matching strategy can be rearranged and/or one or more such steps can be omitted to achieve the same results described herein. Elements of different embodiments described herein may be combined to form other embodiments not specifically set forth above.

In other embodiments, the service-oriented architectures 10 and 30 can be part of SAP® offering running inside or outside an SAP® enterprise system as a standalone system. This standalone system can work with other enterprise systems from other companies. In one example, the EHF 12 (which performs process 40) can be installed locally in a computer and the enterprise system can be installed remotely at other location. The local computer can be a regular networked computer or special mini-computer, such as the Stargate® server from Intel®.

A number of embodiments of the invention have been described. Nevertheless, it will be understood that various modifications may be made without departing from the spirit and scope of the invention. For example, EHF 12 could be another component added to the architectures 10 and 30. The EHF 12 may be a component within a process component. The implementation of the EHF 12 is not limited to service-oriented architectures be used in other types of architectures. The EHF 12 is not limited to software systems, and could also handle errors that occur within interacting hardware components (e.g., such as those within a car). Like stand-alone software modules, hardware components are typically removed from the business process and operate independently of the context of a business process. The EHF 12 could be applied in other setups than those shown in FIGS. 1-2. The EHF 12 may also be implemented in a system that includes a combination of hardware and software modules.

Other embodiments not specifically described herein are also within the scope of the following claims.

What is claimed is:

1. A system to implement an exception handling framework, the system comprising:
    an exception register configured to store multiple error messages and rules comprising instructions for responding to the error messages; and
    an exception handler, at a business process layer, in communication with first and second process components, the business process layer including a collection of different rules governing interaction between business processes performed by the first and second process components in context of a business scenario, wherein the exception handler is configured to:
    detect an error message generated by at least one of the first and second process components;
    determine that the error message is stored in the exception register; and
    respond according to a rule corresponding to the error message, wherein the rule uses information pertaining to the business scenario being implemented in conjunction with the first and second process components, the business scenario being at least partially unavailable to at least one of the first and second process components.

2. The system of claim 1, further comprising a pattern recognition engine configured to:
    identify, over a predetermined time period, occurrences of error messages fitting a pattern, wherein the error messages are generated by the first and second process components;
    present a report showing the occurrences of the error messages fitting the pattern; and
    determine a rule for responding to future occurrences of the error messages fitting the pattern.

3. The system of claim 2, wherein the report comprises information describing at least one of:
    a component that generated one of the error messages within the pattern, a reaction to the occurrences of the error messages fitting the pattern, and preconditions leading to the occurrences of the error messages fitting the pattern.

4. The system of claim 1, wherein the rule comprises instructions that cause the exception handler to:
    determine a severity of an error indicated by the error message in context to the business scenario.

5. The system of claim 1, wherein the rule comprises instructions that cause the exception handler to:
    determine that an error is less severe than indicated by the error message;
    suppress the error message; and
    allow a process that was running during the occurrence of the error message to continue running.

6. The system of claim 1, wherein the rule comprises instructions that cause the exception handler to:
    suppress one or more error messages within a pattern detected by the exception handler.

7. The system of claim 1, wherein the first and second process components belong to a service-oriented architecture.

8. The system of claim 1, wherein the exception handler, and the first and second process components are distributed across different system components.

9. A computer-implemented method for implementing an exception handling framework, the method comprising:
    storing, in an exception register, multiple error messages and rules comprising instructions for responding to the error messages, the exception register being stored in a memory device;
    detecting, at a business process layer, an error message generated by at least one of first and second process components, the business process layer including a collection of different rules governing interaction between business processes performed by the first and second process components in context of a business scenario;
    determining that the error message is stored in the exception register; and
    responding according to a rule corresponding to the error message, wherein the rule uses information pertaining to the business scenario being implemented in conjunction with the first and second process components, the business scenario being at least partially unavailable to at least one of the first and second process components.

10. The computer-implemented method of claim 9, further comprising:
    identifying, over a predetermined time period, occurrences of error messages fitting a pattern, wherein the error messages are generated by the first and second process components;
    presenting a report showing the occurrences of the error messages fitting the pattern; and
    determining a rule for responding to future occurrences of the error messages fitting the pattern.

11. The computer-implemented method of claim 10, wherein presenting a report further comprises displaying information describing at least one of:
    a component that generated one of the error messages within the pattern, a reaction to the occurrences of the error messages fitting the pattern, and preconditions leading to the occurrences of the error messages fitting the pattern.

12. The computer-implemented method of claim 9, wherein responding according to a rule comprises determine a severity of an error indicated by the error message in context to the business scenario.

13. The computer-implemented method of claim 9, wherein responding according to a rule comprises:
    determining that an error is less severe than indicated by the error message;
    suppressing the error message; and
    allowing a process that was running during the occurrence of the error message to continue running.

14. The computer-implemented method of claim 9, wherein responding according to a rule comprises suppressing one or more error messages within a detected pattern.

15. A computer program product for implementing an exception handling framework, the computer program product being tangibly stored on machine readable media, comprising instructions operable to cause one or more processors to:
    store, in an exception register, multiple error messages and rules comprising instructions for responding to the error messages;
    detect, at a business process layer, an error message generated by at least one of first and second process components, the business process layer including a collection of different rules governing interaction between business processes performed by the first and second process components in context of a business scenario;
    determine that the error message is stored in the exception register; and
    respond according to a rule corresponding to the error message, wherein the rule uses information pertaining to the business scenario being implemented in conjunction with the first and second process components, the business scenario being at least partially unavailable to at least one of the first and second process components.

16. The product of claim 15, further comprising instructions to:
    identify, over a predetermined time period, occurrences of error messages fitting ill a pattern, wherein the error messages are generated by the first and second process components;
    present a report showing the occurrences of the error messages fitting the pattern; and
    determine a rule for responding to future occurrences of the error messages fitting the pattern.

17. The product of claim 16, further comprising instructions to display information describing at least one of:
    a component that generated one of the error messages within the pattern, a reaction to the occurrences of the error messages fitting the pattern, and preconditions leading to the occurrences of error messages fitting the pattern.

18. The product of claim 15, further comprising instructions to determine a severity of an error indicated by the error message in context to the business scenario.

19. The product of claim 15, further comprising instructions to:
    determine that an error is less severe than indicated by the error message;
    suppress the error message; and
    allow a process that was running during the occurrence of the error message to continue running.

20. The product of claim 15, further comprising instructions to suppress one or more error messages within a pattern detected by the exception handler.

* * * * *